Figures 6, 7:
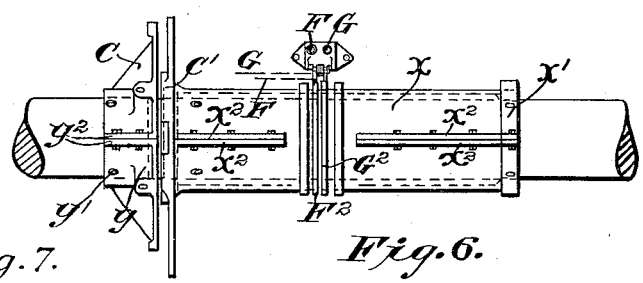

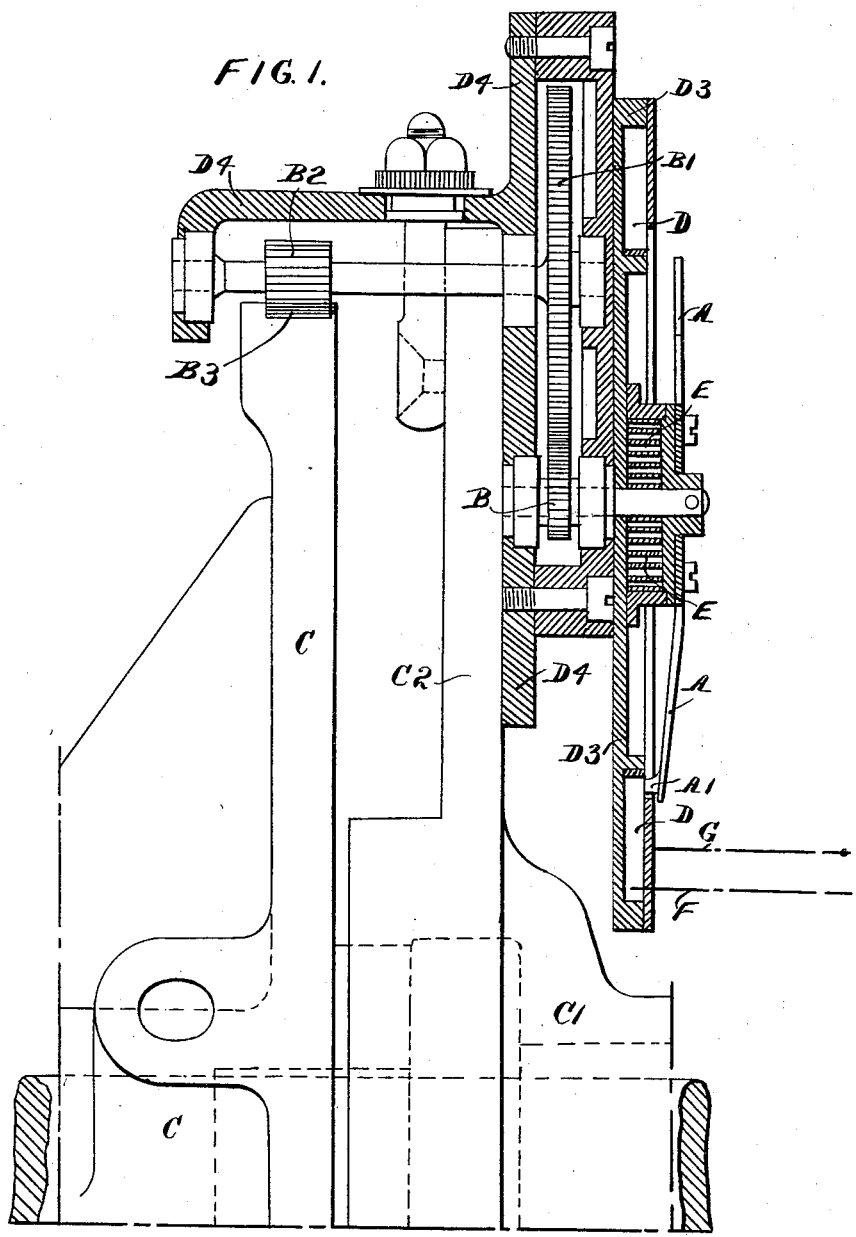

F. T. EDGECOMBE.
TORSIOMETER.
APPLICATION FILED APR. 17, 1912.

1,065,305.

Patented June 17, 1913.
3 SHEETS—SHEET 2.

WITNESSES
L. H. Grote
A. E. Powell

INVENTOR
FREDERICK THOMAS EDGECOMBE
By Howson and Howson
his Attorneys

F. T. EDGECOMBE.
TORSIOMETER.
APPLICATION FILED APR. 17, 1912.

1,065,305.

Patented June 17, 1913.

3 SHEETS—SHEET 3.

WITNESSES

INVENTOR.

FREDERICK THOMAS EDGECOMBE

By Howson and Howson
his Attorneys

UNITED STATES PATENT OFFICE.

FREDERICK THOMAS EDGECOMBE, OF DUMBARTON, SCOTLAND.

TORSIOMETER.

1,065,305.  Specification of Letters Patent.  Patented June 17, 1913.

Application filed April 17, 1912. Serial No. 691,417.

*To all whom it may concern:*

Be it known that I, FREDERICK THOMAS EDGECOMBE, a subject of the King of Great Britain and Ireland, and a resident of Dumbarton, in the county of Dumbarton, Scotland, have invented certain new and useful Improvements in Torsiometers, and of which the following is the specification.

Electrical torsiometers, while they have the advantage that the indicating instrument employed with them may be placed in any convenient position, as its connection with the shaft in which torque is being measured is electrical, have the disadvantage of great delicacy in their parts, particularly if they be adapted for wide readings of small amounts. Mechanical torsiometers, while they avoid the disabilities of delicate construction, suffer from the fact that their indicating or recording mechanism is in mechanical connection and must of necessity be close to that part of the shaft where torque is measured—that is to say—in the shaft tunnel or beneath the floor plates of a ship—and very often difficult of access.

The invention has for its object to obtain the advantages of both systems and avoid their disadvantages, and a torsiometer made according to the invention comprises essentially a mechanical torque measuring device and an electrical device operated thereby and indicating or recording that measurement at any convenient point—distant, it may be, from the mechanical device.

An apparatus made according to the invention may further comprise a plurality of electrical devices of different caliber, so that torque may be read either upon a wide scale for small measures, or a close scale for greater measures.

In carrying out the invention the mechanical torque measuring device is of the type described in the specifications of the prior British patents No. 3045 of 1907, No. 25699 of 1908 and the prior United States Patent No. 963669—5th July, 1910; and the electrical indicating device consists of a rheostat, the moving contact of which is operated by one of those parts in that mechanical device to which is transmitted a multiplication of the torque movement. The rheostat is in circuit with a galvanometer or like measuring or recording instrument in the known manner of an electrical resistance varying torsiometer.

In order that the invention and the manner of performing the same may be properly understood, there are hereunto appended two sheets of explanatory drawings in which—

Figure 2:
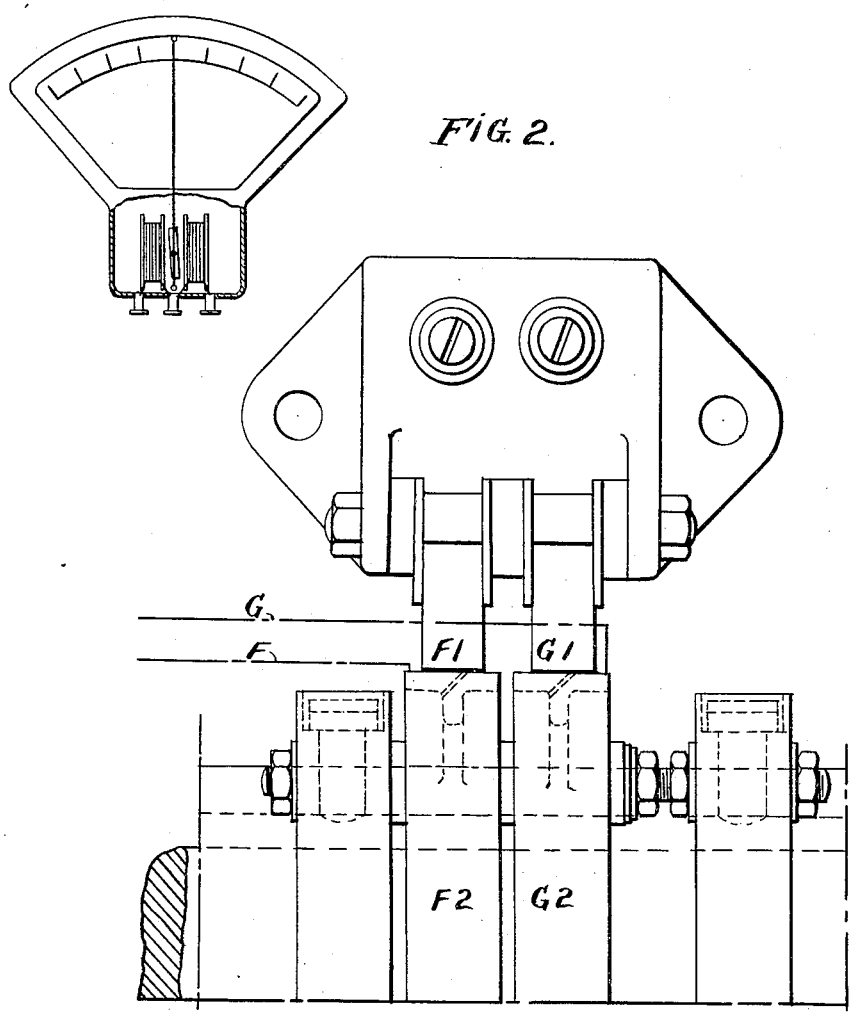
Figure 3:
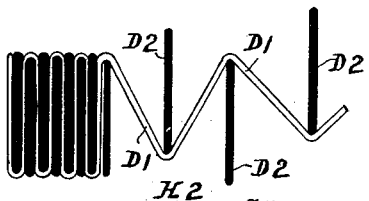
Figure 4:
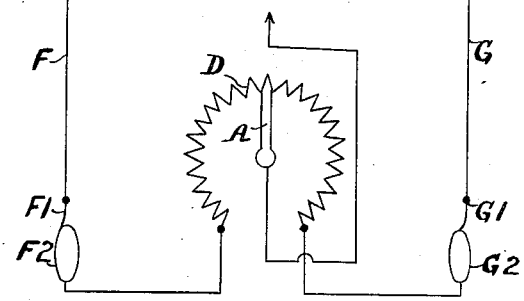
Figure 5:
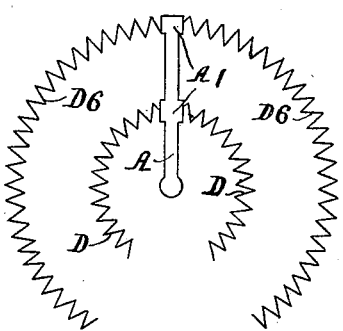

Figures 1 and 2, Sheets 1 and 2, are sectional elevations of such part of a mechanical torsiometer of the type referred to as are necessary to illustrate the carrying out of the invention, and combined therewith an example of part of those electrical devices which form in combination the subject of the present invention, while Fig. 3, Sheet 3, illustrates a preferred method of forming the rheostat, and Figs. 4 and 5 are diagrams of electric connections, while Fig. 6 (Sheet 2) shows in plan the general installation, the details of which are illustrated in the figures above mentioned, and Fig. 7 is a diagrammatic representation of the ammeter used with the construction shown in Fig. 4.

In the mechanical torsiometer referred to there is a drum rotated by multiplying gearing and magnifying the torque-movements of the shaft being tested.

As shown in Fig. 6 the present installation comprises generally a long sleeve $x$ fastened to the shaft at one end $x^1$ in well known manner and carrying at its opposite end a bracket-supporting member $C^1$, disk shaped or otherwise as may be convenient. Facing the member $C^1$ is a second carrier C, the hub $y$ of which extends in opposite direction to sleeve on the shaft and is secured to the latter at $y^1$ in any suitable manner. The securing points of the two members C and $C^1$ are thus spaced remotely apart. Each of these members is preferably formed in halves so that they may be readily adjusted upon the shaft, while flanges $x^2$, $x^2$ and $y^2$, $y^2$ afford means for bolting the respective halves together.

According to the illustrative example of the present invention, shown in Figs. 1 and 2, (in which only about a quarter of the diameter of the shaft is shown) there is substituted for the drum referred to a balanced arm A driven by the usual train of wheels B, $B^1$, $B^2$, from the arc of teeth $B^3$ on the member C moving under torque relatively to the member $C^1$ upon a bracket $C^2$ on which wheel train and arm A are carried. The arm A is adjustable for zero setting and carries a contact piece $A^1$ making contact with an arc of resistance D which may be a curved wire but is preferably built up as shown in Fig. 3 of closely adjacent zig-zags of metallic ribbon $D^1$ between the folds of which are inserted strips $D^2$ of an insulating material such as mica. This arc of resistance is held in a channel in a disk $D^3$ secured to the bracket $D^4$ carrying the multiplying gear. Thus it does not rotate upon its own axis but only bodily with the bracket $D^4$ which in turn is carried by the bracket $C^2$. Within a central drum on this disk $D^3$ is arranged a coil spring E connected at one end to the drum and at the other end to the multiplying gear spindle upon which is carried the contact-bearing arm A. This spring serves in the first place to take up "backlash" in the gear, and in the second place to electrically earth, through the apparatus to the metallic structure of the ship, the contact piece $A^1$. As shown in Figs. 1, 2 and 4 current from an accumulator or other substantially invariable source is led by wires F, G, (indicated diagrammatically) and brushes $F^1$, $G^1$, to slip rings $F^2$, $G^2$, and thence to each end of the arc of resistance D. As has been already said, the contact arm A is earthed, and there is thus provided a separate circuit through each slip ring—one circuit for "ahead" running, the other for "astern." In each of these circuits is a balancing resistance $F^3$, $G^3$, for testing purposes and which can be cut out or in by the operation of switches $F^4$, $G^4$, while in the earth connection is also a switch H, so that circuit may be broken when no reading is desired. In the earth connection is also a rheostat and traveling contact $H^1$ by which the instrument used for indicating (or recording) may be adjusted, the two circuits F, G, and the earth connection finally terminating in the three terminals $F^5$, $G^5$, $H^2$, of differentially wound duplex ammeter or other equivalent instrument having a scale calibrated in torque units.

According to a second example, and as illustrated in Fig. 5, there are two arcs of resistance, D, $D^6$, the one at lesser, the other at greater radial distance. Two double alternative circuits with the ammeter or other instrument—one for each resistance—are provided. The resistances preferably subtend equal angles at their common center, so that a greater reading is given for the same angular movement on the outer than on the inner arc. The ammeter is provided with two scales—a wide scale for the inner circuit and a narrow for the outer.

The ammeter or other instrument used may be provided with devices recording upon a chart in known manner.

What I claim is:—

1. In a torsiometer for shafts, a pair of adjacent members operatively connected to the shaft at points spaced remotely apart, means for multiplying the relative motion of said members, an indicator mechanically actuated by said multiplying means in combination with an electrically operated indicator comprising a resistance element and means in connection with said multiplying mechanism for varying the resistance of said element upon a variation of the torque.

2. In a torsiometer for shafts, a pair of adjacent members operatively connected to the shaft at points spaced remotely apart, means for multiplying the relative motion of said members, an indicator arm mechanically actuated by said multiplying means, in combination with an electrically operated indicator comprising a rheostat, a contact on said indicator arm coöperating with said rheostat to vary the resistance thereof upon a variation of the torque, together with an electrical instrument at a distance in the rheostat circuit for indicating such variations in resistance.

3. In a torsiometer for shafts, a pair of adjacent members operatively connected to the shaft at points spaced remotely apart, means for multiplying the relative motion of said members, an indicator arm mechanically actuated by said multiplying means, in combination with an electrically operated indicator comprising a rheostat, a contact on said indicator arm coöperating with said rheostat to vary the resistance thereof upon a variation of the torque, together with an ammeter in the rheostat circuit for indicating the variations in the current caused by the variation of resistance in said rheostat.

4. In a torsiometer for shafts, a pair of adjacent members operatively connected to the shaft at points spaced remotely apart, means for multiplying the relative motion of said members, an indicator arm mechanically actuated by said multiplying means, in combination with an electrically operated indicator comprising a rheostat with two arcs of contact thereon, contacts on said indicator arm coöperating with said rheostat contacts, a double scale ammeter and means for putting said ammeter in circuit alternatively with either arc of contacts, substantially as described.

In testimony whereof I have signed my name to this specification, in the presence of two subscribing witnesses.

FREDERICK THOMAS EDGECOMBE.

Witnesses:
WILFRED HUNT,
BESSIE DUNCAN LOGAN.